Patented Apr. 19, 1938

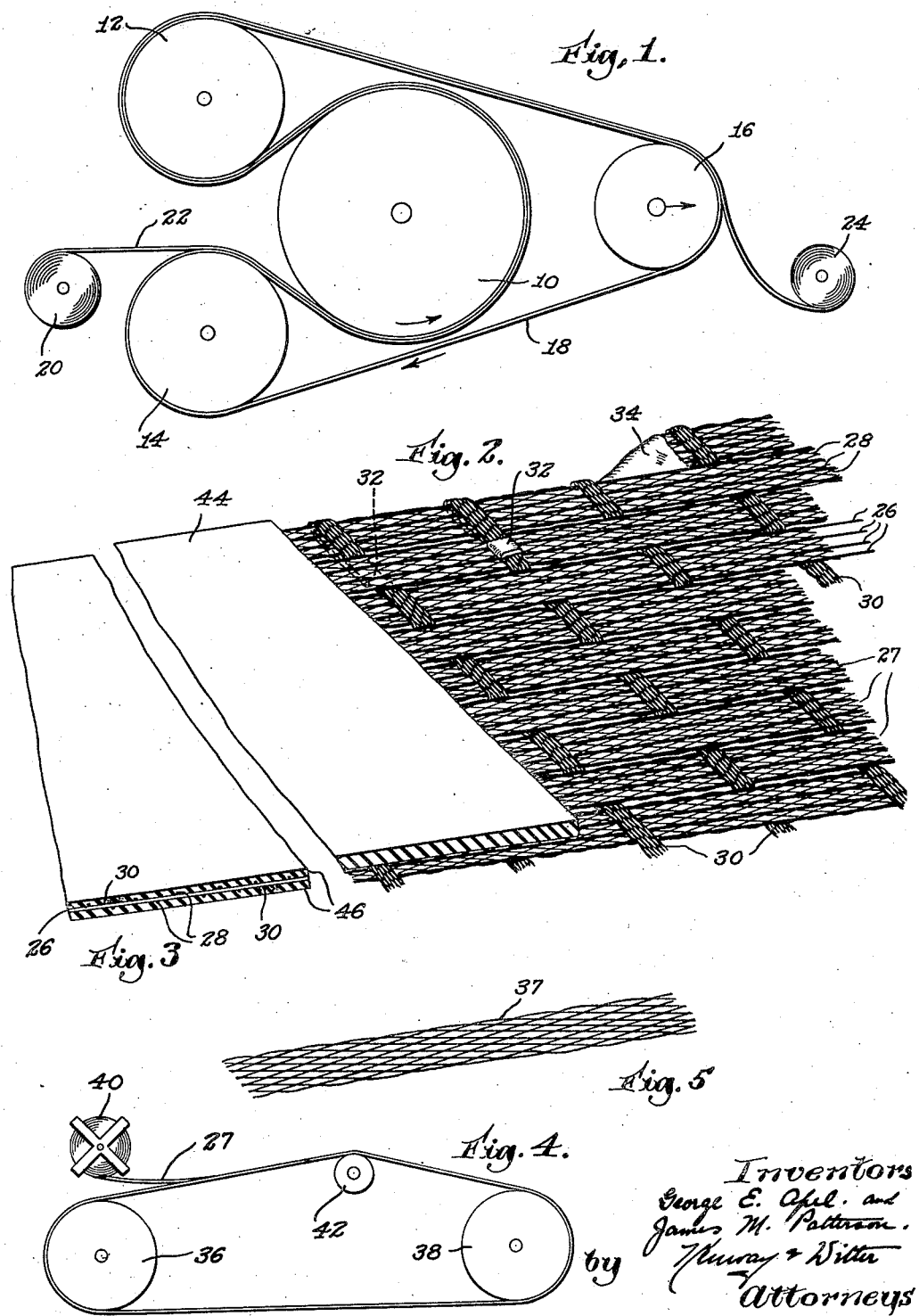

2,114,517

UNITED STATES PATENT OFFICE 2,114,517

TENSION BAND

George E. Apel, Belmont, and James M. Patterson, Waban, Mass., assignors to Boston Woven Hose and Rubber Company, Cambridge, Mass., a corporation of Massachusetts Application April 17, 1934, Serial No. 720,974

5 Claims. (Cl. 74—237)

This invention relates to vulcanizing machines of the type employing an endless tension band as one of two cooperating molding or pressure applying elements. The invention consists in such a tension band of novel and improved structure and includes within its scope a novel method of making the same.

In vulcanizing machines of this general type, it is customary to employ a heated cylinder of relatively large diameter in cooperation with an endless tension band which is passed about a portion of the circumference of the cylinder and engages, under conditions of heat and molding pressure, sheet material containing rubber which is introduced between it and the cylinder. It is important that such a tension band be flexible to a high degree in order that it may conform accurately to the curvature of the cylinder and exert a continuous even pressure upon the material being vulcanized. It is also important that the tension band should possess a high tensile strength since the cylinder is often of large diameter and the resulting tension in the band to secure adequate pressure must be high per unit of width. The band must also have the capacity for continued flexing for long periods of use under conditions of severe tension in passing about the guide pulleys of the machine and this, in turn, is a condition tending to limit the thickness of the band since the internal strain caused by continued flexing of a thick band is likely to break down or disorganize its internal structure.

The present invention deals with these difficult problems and with them in mind, an important feature of the invention consists in a tension band comprising a fabricated wire base made up of longitudinally disposed strands and carrying and permeated by a continuous band of vulcanized rubber bonded thereto. The term fabricated is used herein to designate a structure woven, braided, twisted or otherwise organized of wire. One satisfactory example of such structure is supplied by a flat strand made up of a series of straight, longitudinally-disposed wires united by other undulating wires braided or woven therewith. A strong, thin and flexible metallic base may be constructed of such fabricated strands laid side by side and secured in such relation in any desired manner, as for example, by a series of spaced, transverse strands looped about the longitudinal strands and suitably secured. Preferably and as herein shown, the longitudinal strands may be assembled and fastened under conditions of tension and are thus caused to lie straight and without tendency to stretch or distort in the finished tension band.

We have found it desirable to utilize a single continuous length or strand of fabricated wire in the construction of the metallic base and to lay such strand under tension with a plurality of its coils in edge contact, and then, having thus provided the longitudinal elements of the band, to bind them in position and against lateral displacement by interweaving transverse fabricated strands independently secured in the base by solder or otherwise.

Having constructed the metallic base in the manner above outlined, the tension band is completed by forcibly imbedding the base in sheet rubber material so that the base is entirely concealed and a smooth continuous contact surface provided which is entirely outside the metallic base. We have found that this step of our novel method may be advantageously carried out by running the endless metallic base under tension about the heated cylinder of the vulcanizing machine in which it is to be used and feeding into the bite of the cylinder and the metallic band constituting the base a continuous sheet of unvulcanized rubber of suitable width and thickness entirely to envelop and encase the metallic base. In this step the rubber is forced into and through the interstices of the fabricated wire structure of the base and becomes bonded thereto by vulcanization as it is advanced with the metallic base about the circumference of the cylinder.

These and other features of the invention will be best understood and appreciated from the following description of a preferred embodiment thereof, selected for purposes of illustration and shown in the accompanying drawing, together with successive steps in its manufacture.

In the drawing,

Fig. 1 is a diagrammatic view of one type of vulcanizing machine employing an endless tension band of the character herein disclosed;

Fig. 2 is a view in perspective of a portion of a tension band in process of manufacture;

Fig. 3 is a similar view of a small portion of the completed tension band;

Fig. 4 is a diagrammatic view illustrative of the step of assembling the fabricated wire strand in making the tension band; and Fig. 5 is a view in perspective of a short length of fabricated strand of alternative construction.

In Fig. 1 is diagrammatically shown one form of vulcanizing machine employing the tension band which is the subject of this invention. The machine includes a large heated cylinder 10 suitably supported to turn in bearings, not shown, and preferably heated by steam circulated through its journals. Pulleys or drums 12, 14 and 16 are so arranged as to direct the tension band 18 about substantially 270° of the circumference of the cylinder 10. These drums are arranged so as to impart to the tension band 18 an approximately triangular path having a reentrant portion in which is included the cylinder 10. The drum 16 is mounted for horizontal adjustment and may be moved bodily toward or from the cylinder 10 to regulate the tension of the band 18. In some cases it is desirable to heat the band as well as the cylinder 10, while in other cases the heat supplied by the heated cylinder 10 is entirely adequate for the vulcanizing operation.

The rubber-containing material 22 to be vulcanized is supplied in sheet form from a reel 20 and from this it is led into the bite of the band 18 and the cylinder 10. It is passed slowly about the circumference of the cylinder 10 under conditions of heat and pressure, being molded and vulcanized in the process, and is then led off about the drum 12, over the drum 16 and to a winder reel 24, whereon the molded and vulcanized sheet is wound up. It will be understood from the diagram of Fig. 1 that the tension belt is being continuously and reversely flexed as it passes about the cylinder 10 and the drums 12, 14 and 16 and that it is maintained throughout this flexing under severe tension by the drum 16, the bearings of which are forced continuously away from the cylinder 10 by hydraulic or mechanical means.

In constructing the endless tension band of our invention in the form herein disclosed, we may prefer to employ a flat braided strand of wire which includes four straight, spaced longitudinal wires 26 and a plurality of somewhat finer wires 28 braided together and with the longitudinal wires 26 to form a self-contained fabricated strand 27 of high tensile strength and minimum thickness. The fabricated strand 27 may be supplied from a roll 40, as indicated in Fig. 4, and may be drawn from the roll continuously and led over a guide pulley 42 and passed or wound about spaced pulleys 36 and 38 in a plurality of turns or coils which together produce the endless metallic base of our improved band. In this way the one continuous strand 27 is arranged in parallel coils disposed in edge to edge contact and laid under a uniform tension which maintains them straight and without further capacity for stretching. In Fig. 2 the longitudinal strands are represented as having been arranged in this manner. The two ends of the strand 27, being located upon opposite sides of the endless metallic base, may be fastened separately and permanently by solder 34, thus forming a complete endless and inextensible metallic band.

Having assembled the longitudinal strands of the base or wire structure in edgewise relation, it is advisable to secure them against lateral separation. As herein shown, this is done by interweaving transverse wire strands 30 with the longitudinal strands 27. The strands 30 are also fabricated of wire and are herein shown as being of braided construction. At each edge of the metallic base the ends of the transverse strands 30 are looped about one or more of the longitudinal strands and the free end is soldered, as by solder 32, to the body of the strand. With the fastening of the transverse strands 30, the metallic and endless tension-carrying base is completed and its high tensile strength, as well as its flat and open work or foraminous characteristics, will be apparent from the foregoing description. The longitudinal wires 26 may well be .017" or thereabout in diameter and of a tensile strength approximating 425,000 pounds per square inch.

The tension band may now be completed by enclosing the wire structure of the metallic base in sheet rubber. To this end, the base is first coated with a heat-resisting rubber cement and allowed to dry. A sheet of heat-resisting, unvulcanized rubber 44 of suitable width and thickness may next be laid upon the fabricated base and fed into the machine, whereupon the unvulcanized rubber is forced into the meshes and interstices of the metallic base. This is effected slowly as the metallic and rubber plys are carried about the circumference of the cylinder 10, with the result that the rubber sheet becomes distributed in plies 46 of substantially equal thickness on both sides of the metallic base and, as the process continues under heat, the rubber becomes firmly vulcanized and bonded to the wire of which the base is constructed. The rubber sheet 44 may be about .125" thick and it is spliced by butting straight across the band and skiving the edges until perfectly smooth. The rubber plies 46, therefore, supply smooth, continuous and yielding opposed surfaces for the tension band or, if desired, the rubber surface may be molded into longitudinal ribs or other configuration which it may be desired to impart to the material to be vulcanized in the machine.

While we have shown the rubber envelope of the tension band as supplied in sheet form to the metallic base, it will be understood that in some cases it may be preferable to supply it in other form, as in a mass to be distributed and forced into the metallic base at the same time.

It will be understood that the flat fabricated strands 27 are important elements of our invention and that these strands may be fabricated of wire woven in any convenient and suitable manner which will provide strands having the necessary properties to perform the function of the finished tension band. In Fig. 5 we have shown, by way of example, a modified form of flat fabricated strand 37. This strand is constructed of a plurality of transversely extending and interwoven wires all of the same gauge, the longitudinally extending wires 26 shown in the strip 27 being omitted. This strand 37 is somewhat more flexible than the strand 27 and for some purposes may be preferred thereto.

In some cases it may be desirable to treat the wire, prior to the application of the rubber thereto, for various purposes, such as to secure a better adhesion of the rubber to the wire. For example, we may copper or brass plate the wire whereby to secure better adhesion of the rubber covering thereto and we may chromium plate the wire for the purpose of resisting corrosion thereof.

It will now be apparent that we have produced a tension band of superior construction from the standpoints of greater strength and flexibility, more uniform thickness, etc., and a band which can be made relatively thin and yet sufficiently strong for the purposes to be performed. The use of our continuous endless strands of braided wire allows a certain amount of motion in the tension band itself during the period of running in and thereby permits the band to adapt itself better to the rolls and to relieve much of the internal stress which was set up in the band during the process of its construction.

Having thus described our invention, what we claim as new and desire to secure by Letters Patent is:

1. An endless tension band for vulcanizing machines, comprising a flat fabricated strand of wire wound into a helix with the adjacent convolutions thereof disposed in edge to edge relation, means binding the convolutions against separation, and rubber vulcanized to the metallic base thus provided.

2. An endless tension band for vulcanizing machines, comprising a metallic stress-carrying base including in its structure a flat strand fabricated of wire, the strand being disposed in helical coils arranged in edge to edge relation, transverse wire strands binding said coils together, and rubber vulcanized to and covering said base.

3. An endless tension band for vulcanizing machines, comprising a metallic stress-carrying base built up of a flat strand fabricated of wire with portions thereof laid side by side in edge to edge relation to form a helix, transverse wire strands interwoven therewith and looped about the outer convolutions and binding the convolutions together, and rubber vulcanized to and covering said base.

4. An endless tension band for vulcanizing machines, comprising a metallic stress-carrying base including in its structure a plurality of straight wires extending longitudinally therethrough and interwoven with undulating wires, to form a flat fabricated strand, said strand being disposed in helical coils arranged in edge to edge relation, transverse strands of binding wires securing said coils together, and rubber filling the space about said wires and presenting an unbroken pressure surface for engagement with the stock to be vulcanized.

5. An endless tension band for vulcanizing machines, comprising a flat strand of woven wire disposed in helical coils arranged in edge to edge relation and forming an endless metallic base of high tensile strength, and rubber molded into the interstices of said base and presenting a smooth pressure surface for stock to be vulcanized.

GEORGE E. APEL.
JAMES M. PATTERSON.